United States Patent [19]

Brandt et al.

[11] Patent Number: 4,604,032
[45] Date of Patent: Aug. 5, 1986

[54] ROTOR DEVICE

[75] Inventors: Lennart H. Brandt, Fjärås; Heinz Pichl, Upsala, both of Sweden

[73] Assignee: AB Volvo Penta, Gothenburg, Sweden

[21] Appl. No.: 622,658

[22] Filed: Jun. 20, 1984

[30] Foreign Application Priority Data

Jun. 22, 1983 [SE] Sweden ................. 8303593

[51] Int. Cl.$^4$ .................. B63H 5/10; B64C 11/48
[52] U.S. Cl. .................. 416/128; 416/129; 415/68
[58] Field of Search .............. 416/129, 128; 415/68

[56] References Cited

U.S. PATENT DOCUMENTS

| 1,489,817 | 4/1924 | Campbell | 416/128 |
| 1,887,429 | 11/1932 | Price | 416/128 |
| 2,282,266 | 5/1942 | Swaskey | 416/129 |
| 2,383,385 | 8/1945 | Heintze | 416/129 X |
| 2,451,944 | 10/1948 | Hall | 416/198 A X |
| 2,461,931 | 2/1949 | Smith et al. | 415/68 X |
| 2,765,040 | 10/1956 | Darrah | 416/129 |
| 3,087,553 | 4/1963 | Kostyun | 416/129 X |
| 4,464,095 | 8/1984 | Iida | 416/129 X |

FOREIGN PATENT DOCUMENTS

| 880103 | 6/1953 | Fed. Rep. of Germany | 416/129 |
| 777930 | 3/1935 | France | 416/128 |
| 978998 | 4/1951 | France | 416/128 |
| 980003 | 5/1951 | France | 416/128 |
| 402447 | 3/1943 | Italy | 416/128 |
| 586186 | 3/1947 | United Kingdom | 416/129 |

Primary Examiner—Everette A. Powell, Jr.
Attorney, Agent, or Firm—Arthur G. Yeager

[57] ABSTRACT

The invention relates to a rotor device, preferably a boat propeller device. The propeller shaft drives, via a planetary gear system, two propellers in the rotational direction of the shaft and one propeller counter to the rotational direction of the shaft. The propellers are dimensioned so that they absorb approximately equal torques.

10 Claims, 7 Drawing Figures

ROTOR DEVICE

The present invention relates to a rotor device, comprising a plurality of bladed rotors carried on a shaft and designed to impart a flow to a fluid or be cause to rotate by such a flowing fluid.

The invention relates generally to rotor devices of the above-mentioned type, which can, for example, be included in pump or turbine systems or be a propeller unit for boats and airoplanes. The invention has, however, primarily been developed to solve problems occurring in boat propeller units.

A marine inboard installation consists of an engine, a reduction gearing with a reversing gear, propeller shaft with propeller. For marine diesel engines in the 400 HP class, the engine speed is usually about 2400–2600 rpm, which must be substantially reduced for the propeller to be efficient. At speeds of about 15 knots, an rpm reduction of 1:2 can be normal, but for heavier boats with long operating periods, for which fuel cost is of particular importance, it can be desirable to have rpm reductions of up to 1:4 or 1:5. At the same time as the propeller speed is reduced, the torque increases which must be transmitted via the reversing gear and the propeller shaft to the propeller, also increasing their dimensions.

By way of example it can be mentioned that the above power and speed ranges require a change of the reduction from 1:2 to 1:4, which increases the propeller efficiency from hardly 50% to about 60%, that the diameter of the propeller shaft is increased by about 25% and the propeller diameter is increased by about 60%. Thus, the gains made by increased propeller efficiency with accompanying reduced fuel costs are partially negated by higher costs for the reversing gear, shaft and propeller. The total costs for the last-mentioned components can be very high, up to half of the cost for the engine. A further problem is that the large propeller diameter creates space problems, which make it practically impossible to use a reduction of 1:4 or higher in so-called inboard-outboard drives. A known solution to the problem of obtaining high propeller efficiency at the same time as the propeller diameter does not need to be greater than what is practical for inboard-outboard drives for said engine power class, is to arrange two counter-rotating propellers driven by concentric shafts. The cost for such an installation is, however, high as it involves long hollow shafts.

The purpose of the present invention is to achieve a rotor device of the type described by way of introduction, especially a boat propeller unit which can be manufactured at much lower cost than previously known devices of this type without sacrificing efficiency.

This is achieved according to the invention by virtue of the fact that the shaft is drivingly connected to the sun gear in a planetary gear system, that N rotors are drivingly connected to a gear ring which engages the planet gears of the planetary gear system, for rotation counter to the rotational direction of the shaft, and that N+1 rotors are drivingly connected to the planet gear carrier of the planetary gear system for rotation in the rotational direction of the shaft.

The basic idea of the invention is that the reduction of the engine rpm is not to be done prior to the rotor, i.e. in the reversing gear, but in the hub of the rotor device, which makes it possible to make the dimension of both the reversing gear and the shaft much smaller and thus less expensive than previously. On this basis, a rotor device has been developed which due to the above-mentioned ratio between the number of rotors rotating with and counter to the shaft, can be self-balancing due to the fact that one of the rotors rotating with the shaft balances the torque of the shaft, while the remaining pairwise counter-rotating rotors balance each other.

A boat propeller device with three propellers, which is optimally designed according to the principles of the invention, will have a propeller diameter which is approximately ⅜ of the diameter of an optimally designed single propeller for a reduction ratio of 1:4 or 1:5. The total cost for the reversing gear, shaft and propeller arrangement will be approximately half of the cost of the corresponding single propeller installation, while the efficiency will be the same for both installations.

The invention will be described in more detail with reference to examples shown in the accompanying drawings, where FIG. 1 shows a longitudinal section through a rotor device according to the invention in a general embodiment;

Figure 1:
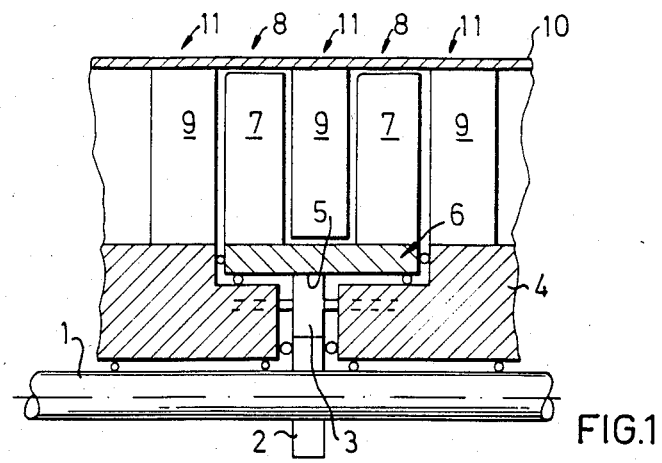

The rotor device shown schematically in FIG. 1 can be a pump, compressor, fan or turbine. A shaft 1, which, depending on the application, is the input or output shaft, carries a gear 2 which is the sun gear in a planetary system and engages the planet gears 3 on a planet gear carrier 4. An internal gear ring 5 on a cylindrical hub 6 engages the planetary gears 3. The hub 6 carries two sets of rotor blades 7 and thus forms together with blades 7 two rotors 8 solidly joined to each other which rotate counter to the rotational direction of the shaft. The planetary gear carrier 4 is joined to three sets of corresponding rotor blades 9, of which the two outer sets are joined both to the planetary gear carrier and to a surrounding cylindrical element 10, while the intermediate set of blades 9 is only mounted in the cylinder 10, thus forming three rotors 11 joined solidly to each other and rotating in the rotational direction of the shaft.

The invention is based on the insight that for a given maximum diameter, the best efficiency is obtained, when the rotors of the rotor device have approximately the same rotational speed and diameter and brake approximately the same torque. Certain minor deviations from these equal values can be required due to the fact that the rotors induce velocities in the surrounding medium both axially and rotationally, calling for adjustment of the diameter and pitch (see FIG. 2). The requirement according to the invention is that if the number of rotors rotating counter to the direction of shaft rotation is N, the number of rotors rotating in the direction of the shaft should be N+1, in order to obtain a balance of torque when the rotors rotate at the same rpm. In the embodiment shown in FIG. 1, N=2, and the following relationships apply:

| shaft 1 torque | +Q |
| --- | --- |
| brake torque of rotors rotating with shaft | −3Q |
| brake torque of rotors rotating counter to shaft | +2Q |

| -continued | |
|---|---|
| total | 0 |

Thus, there is an equilibrium of torque when the torque for one rotor corresponds to the input torque. This means that the hub reduction which is built into the system must increase the torque by 5 times, and distribute the torque equally among the five rotors. This also means that with no power losses, the power will be unchanged and the rpm will have been reduced to 1/5 of the shaft rpm. Generally this means that the reduction must be 1:1+2N, which means that the basic reduction in the planetary system, which is the ratio between the gear diameters of the gear ring 5, which drives the counter-rotating rotors 8, and the sun gear 2 should be 2:1 in the example shown in FIG. 1. This means generally that the basic reduction should be N:1.

Figure 2:
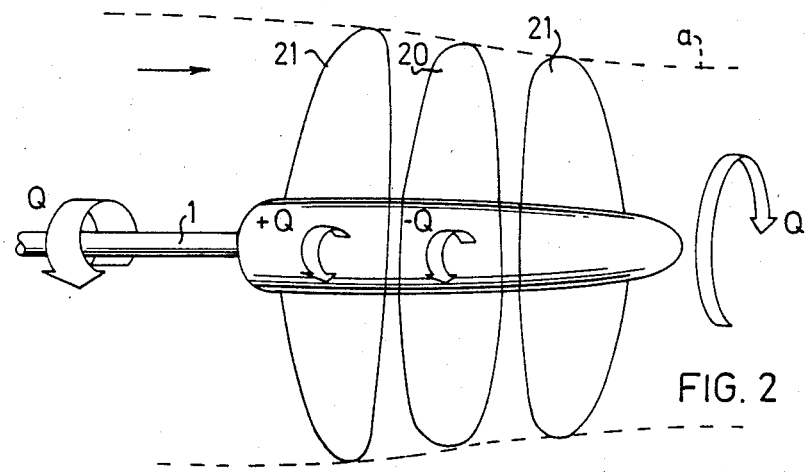
FIG. 2 shows schematically a boat propeller device.
Figure 3:
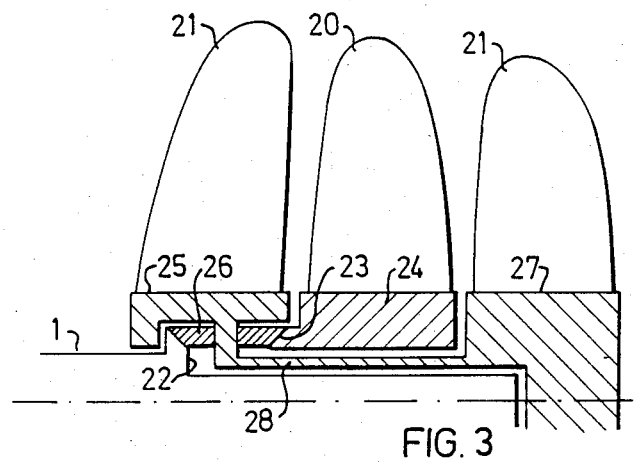
FIG. 3 shows a longitudinal section through the device in FIG. 2.

FIGS. 2 and 3 show an additional embodiment to illustrate the above relationships. The Figures show schematically a boat propeller arrangement with three propellers 20, 21 (i.e. N=1). The front and rear propellers 21 are driven in the direction of the shaft 1, while the intermediate propeller 20 rotates counter to the shaft. As shown in FIG. 2, the front and the intermediate propellers can be regarded as a pair rotating counter to each other and balancing the others' torque, while the torque of the rear propeller balances the torque of the shaft. The diameters of the propellers are adjusted here with respect to the contraction of the slip stream.

Since N in this example is 1, the basic reduction is 1:1, which makes it possible, as shown in FIG. 3, to make the planetary system as a simple differential. The shaft 1 carries a sun gear 22 with a conical gear ring, and a gear 23 with a corresponding conical gear ring is arranged on the hub 24 of the intermediate propeller 20. The hub 25 of the front propeller 21 forms the carrier for conical planetary gears 26 and is solidly joined to the hub 27 of the rear propeller via a sleeve 28. Here the propeller rpm is reduced to ⅓ of the shaft rpm.

By gearing down the engine speed in the propeller hub, the reversing gear of the engine can also be made as a simple differential gear (not shown) with a basic reduction of 1:1. For forward drive, the gearing is locked together as a unit by a clutch for example, which joins the input shaft to the planetary gear carrier. For reverse, the planetary gear carrier is locked for example to the engine fly wheel casing, and the output shaft will rotate counter to the input shaft. The gear ratio both forward and reverse is 1:1. Forward drive produces no losses except for those caused by any oil circulating in the gear housing. The differential in the reversing gear can in principle have the same dimensions and gear cut as the differential described above in the propeller hub, which helps reduce costs.

Figure 4:
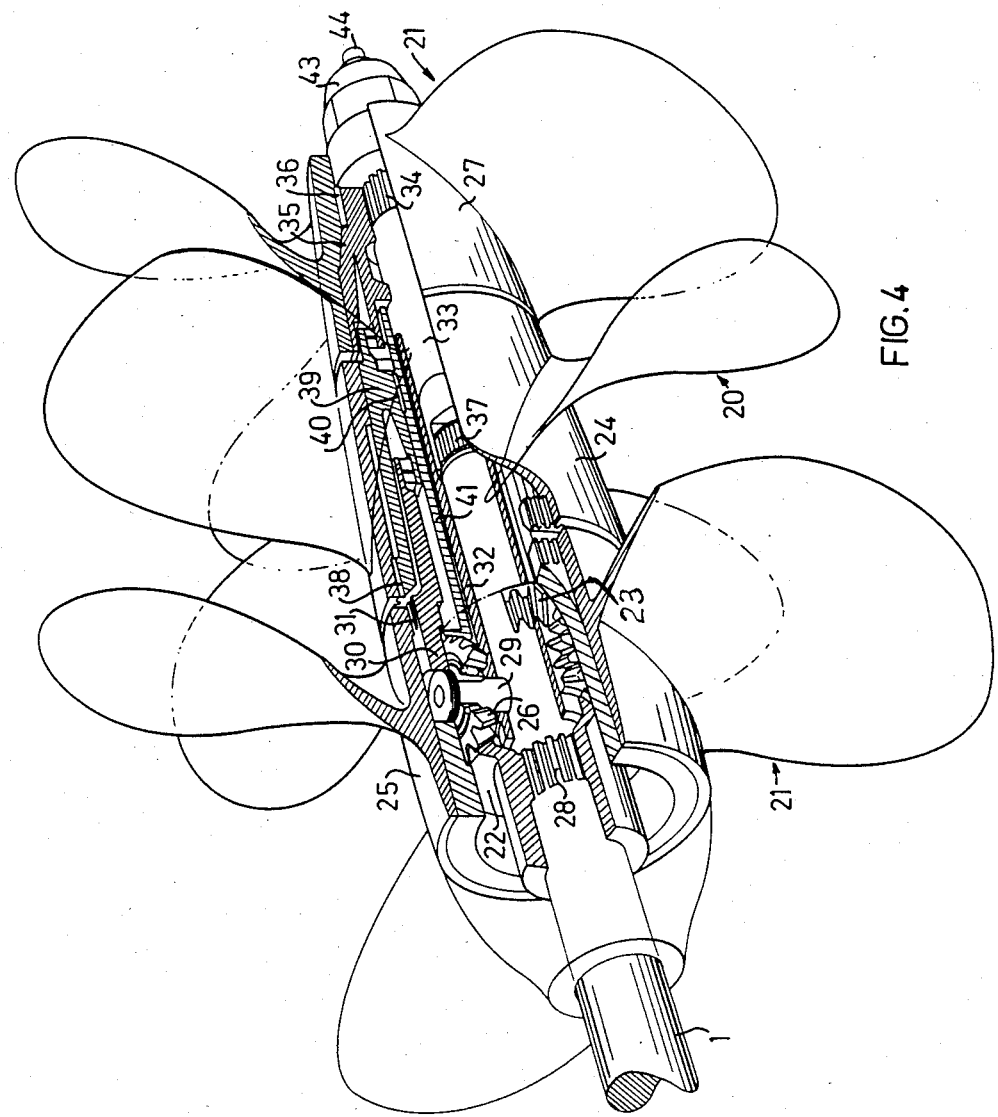
FIG. 4 shows a partially cut-away perspectice view of an embodiment of a boat propeller device.

FIG. 4 shows the propeller device in FIGS. 2 and 3 in a practical embodiment, in which details irrelevant to the actual invention, such as certain bearings, seals and the like have been left out and where details with counterparts in FIGS. 2 and 3 have been given the same reference numerals as in these Figures.

The shaft 1 is non-rotatably joined to the sun gear 22 via spline 28. The planetary gears 26 are mounted on spindles 29, which are fixed in a sleeve 30 with which the hub 25 of the forward propeller is non-rotatably joined via splines 31. The inner ends of the radial spindles 29 are mounted in a sleeve 32 into the rear end of which a shaft 33 is pressed, which is joined via splines 34, a sleeve 35 and further splines 36 to the hub 27 of the rear propeller 21. The front end of the shaft 33 is mounted in a needle bearing 37 on the rear end of the propeller shaft 1. Thus, the sleeves 30, 32 act as the planetary gear carrier which is non-rotatably joined to the propellers 21.

The hub 24 of the middle propeller 21 is joined via splines 38 to a sleeve element 39 which is in turn joined via splines 40 to an additional sleeve element 41, which is rotatably mounted relative to the sleeves 30, 32 acting as the planetary gear carrier. The sleeve element 41 has gear teeth 23, which engage the planetary gears 26 and are thus identical to the sun gear 22.

The gears 22, 26, 23 of the planetary system or differential rotate in an oil bath and the hub system is therefore sealed off from the surrounding water by means of seals which are not shown in more detail here. In order to be sure that water cannot leak in, the oil is pressurized by means of a pressure accumulator 43, which contains a spring-loaded membrane or bellows element (not shown), which is joined to a pin 44 extending through the accumulator housing. The farther the pin extends, the higher the pressure is. Thus, the pin acts as a pressure indicator which provides a direct visual check that the recommended pressure is still maintained.

Figure 6:
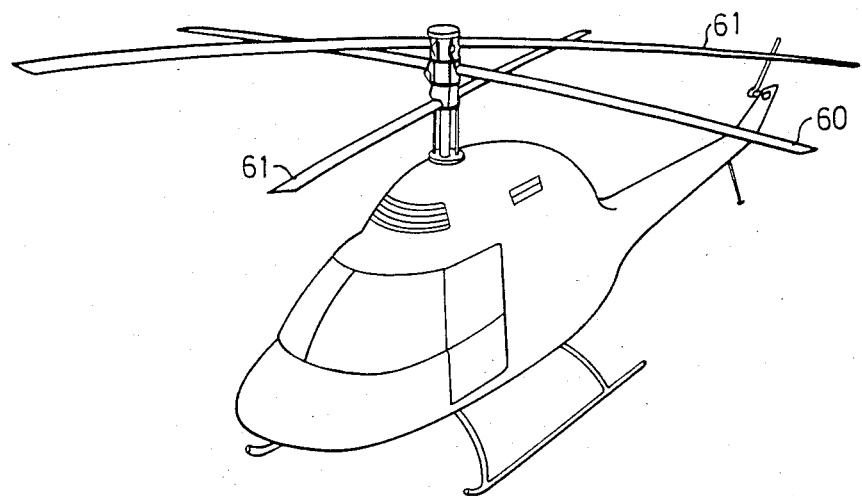
FIGS. 5, 6 and 7 show schematic perspective views illustrating further applications of the rotor device according to the invention.
Figure 5:
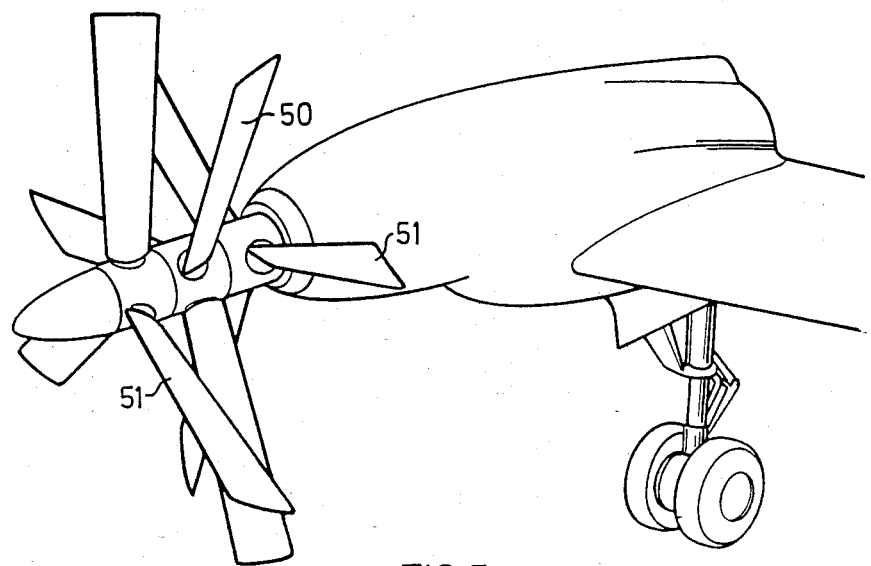
Figure 7:
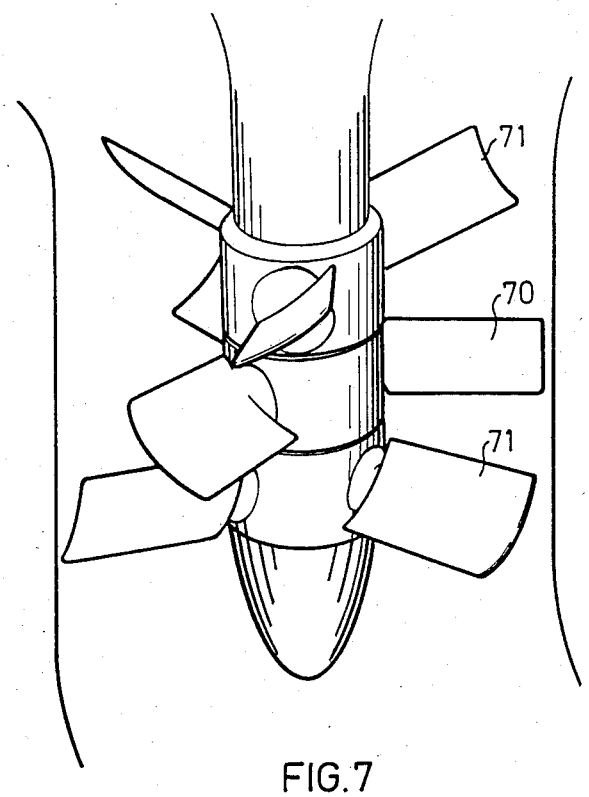

Further applications of the principle of the invention are illustrated in FIGS. 5–7. FIG. 5 shows a propeller device for aeroplanes with one counter-rotating propeller 50 and two propellers 51 rotating with the propeller shaft. FIG. 6 shows a helicopter with one counter-rotating rotor 60 and two rotors 61 rotating with the shaft.

All of the embodiments described above of the rotor device have a driving power shaft, but the invention is, as was indicated in the introduction, not limited to such rotor devices, but also encompasses rotor devices with a driven power shaft. An example of the last-mentioned type is shown in FIG. 7 in the form of a water turbine with one counter-rotating rotor 70 and two rotors 71 rotating with the shaft. By virtue of the fact that the rotor diameter can be reduced substantially, as in the embodiment described above, in comparison with a single rotor installation, the conduit area can also be reduced, thus further reducing costs.

What we claim is:

1. In a rotor device having at least three coaxial bladed rotors, a shaft, and a planetary gear system including at least one sun gear carried by said shaft, at least one planet gear meshing with said sun gear and carried by a planet gear carrier, and a gear ring meshing with said planet gear, said rotors having blades to impart a flow to a fluid when rotating or to be rotated by a flowing fluid, the improvement wherein a number of N said rotors are drivingly connected to said gear ring and a number of N+1 said rotors are drivingly connected to said planet gear carrier thereby causing N said rotors to rotate in a direction counter to the rotational direction of said shaft and N+1 said rotors to rotate in the same direction as said shaft.

2. In the device according to claim 1, wherein the ratio between the rolling diameters for said gear ring and said sun gear are approximately N:1.

3. In the device according to claim 1, wherein said rotors are arranged so that adjacent said rotors rotate counter to each other.

4. In the device according to claim 1, wherein the blade areas and blade angles of said bladed rotors are selected so that each of said rotors absorb approximately the same amount of torque.

5. In the device according to claim 1, wherein the diameters of said rotors vary with the contraction of a slip stream of said rotor device in a fluid.

6. In the device according to calim 1, wherein said rotors are propellers in a propeller unit.

7. In the rotor device according to claim 6, wherein three propellers are provided rotating about said shaft.

8. In the device according to claim 7, wherein said planetary gear system is a differential gear with a gear ratio of 1:1.

9. In the device according to claim 8, wherein said planet gear is mounted on a radial spindle fixed in said gear carrier connected to the forward and rear propeller hubs, and the hub of the middle propeller is connected to a sleeve means carrying said gear ring which engages said planet gear.

10. In the device according to claim 1, wherein said rotor device includes a housing, said planetary gear system being arranged in said housing, said housing being oil-filled and under pressure.

* * * * *